(12) United States Patent
Robinson et al.

(10) Patent No.: US 8,395,655 B2
(45) Date of Patent: Mar. 12, 2013

(54) SYSTEM AND METHOD FOR ENABLING COLLABORATION IN A VIDEO CONFERENCING SYSTEM

(75) Inventors: Ian N Robinson, Pebble Beach, CA (US); April Slayden Mitchell, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 12/856,668

(22) Filed: Aug. 15, 2010

(65) Prior Publication Data
US 2012/0038742 A1 Feb. 16, 2012

(51) Int. Cl.
*H04N 7/14* (2006.01)
(52) U.S. Cl. ............... 348/14.16; 348/14.07; 348/14.08
(58) Field of Classification Search .... 348/14.01–14.16; 715/756, 850, 782
See application file for complete search history.

(56) References Cited

U.S. PATENT DOCUMENTS

| | | | | |
|---|---|---|---|---|
| 7,865,834 | B1* | 1/2011 | van Os et al. | 715/756 |
| 2005/0162510 | A1* | 7/2005 | Rambo et al. | 348/14.07 |
| 2008/0068443 | A1* | 3/2008 | Thielman et al. | 348/14.1 |
| 2008/0266379 | A1* | 10/2008 | Hubenthal et al. | 348/14.08 |
| 2008/0278516 | A1* | 11/2008 | Santon | 345/619 |
| 2009/0315974 | A1* | 12/2009 | Matthews | 348/14.08 |
| 2010/0053027 | A1 | 3/2010 | Tommison et al. | |
| 2010/0149309 | A1* | 6/2010 | Hagen et al. | 348/14.12 |
| 2010/0277563 | A1* | 11/2010 | Gupta et al. | 348/14.08 |
| 2012/0026277 | A1* | 2/2012 | Malzbender et al. | 348/14.07 |

FOREIGN PATENT DOCUMENTS
CN 10148915 A 7/2009
GB 2459971 A 11/2009
WO WO-2009138741 A1 11/2009

OTHER PUBLICATIONS

< http://www.youtube.com/watch?v=BLMp06URTJw > Publication Date: Nov. 3, 2009 ~video~Remote Collaboration/Cooperation on the DiamondTouch Table.
http://www.youtube.com/watch?v=NnL34XwTgag > Publication Date: May 20, 2009 ~ Video ~ "Multi-touch Tablet for Remote Collaboration" ~.

* cited by examiner

*Primary Examiner* — Melur Ramakrishnaiah

(57) ABSTRACT

The present invention is a video conferencing system that includes: a first display area for displaying content shared between at least a first participant at a first location and at least a second participant at a second location in a video conference; and a second display area for displaying the video captured of the at least first participant, wherein the video captured of the at least first participant is spatially consistent with the video captured of the at least second participant.

20 Claims, 11 Drawing Sheets

SYSTEM AND METHOD FOR ENABLING COLLABORATION IN A VIDEO CONFERENCING SYSTEM

BACKGROUND

Many video conferencing and other forms of virtual collaboration recreate face-to-face discussions between remote participants through the exchange of video, audio and/or other content. In many videoconferencing systems, media streams that include video and audio of the participants are displayed separately from the media streams that include content shared between the participants such as electronic documents, visual representations of objects, and/or other audiovisual data. Participants interact with the shared content by use of gestures or alternatively, by using peripheral devices such as a mouse or keyboard. Providing additional information related to how participants are interacting with the shared content and relative to other video conference participants would provide a more realistic collaborative experience.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

Figure 1A:
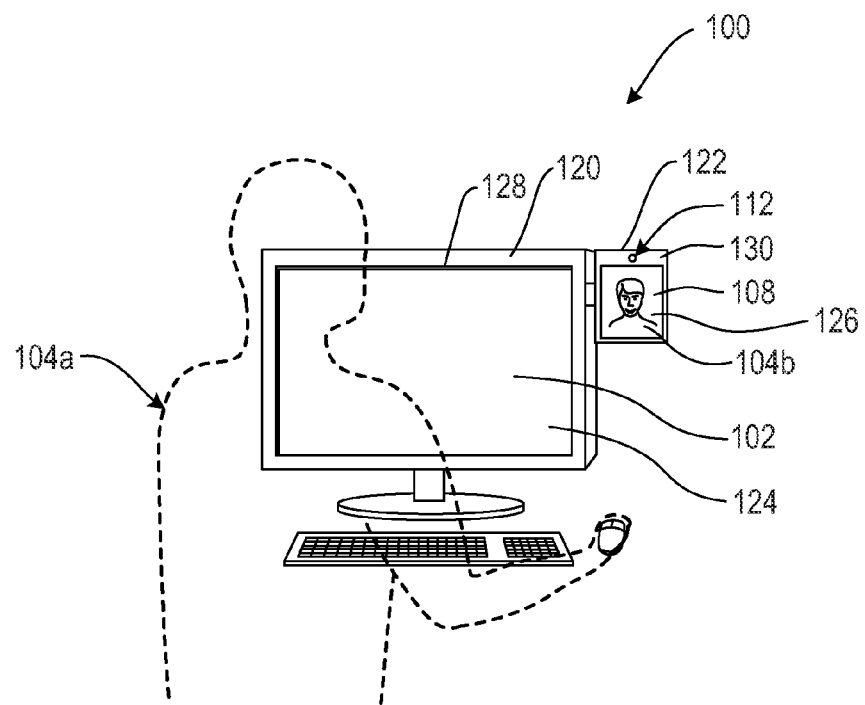
FIG. 1A illustrates a video conferencing system for simulating side by side collaboration in a video conferencing session according to an embodiment of the present invention.

FIG. 1A illustrates a video conferencing system 100 for simulating side by side collaboration in a video conferencing session according to an embodiment of the present invention. We describe solutions for maintaining gaze awareness and gesture positioning during a video conferencing session. In one embodiment, the video conference session simulates side by side collaboration between the local and remote participant. Each node or endpoint in the video conferencing session provides a primary display area for interacting with displaying content. In addition, each node provides a second display area which allows the local participant to interact with a remote participant. The local participant interacts with shared content by sitting in a first position (facing forward) that faces the first display area. Side-by-side collaboration is simulated by placing the second display area to the side of the first display area with that content. When the local participant wishes to interact with the remote participant, he merely looks to the side display. Looking to the side to look at the display of the remote participant is a natural action—as it simulates turning to the side to make eye contact in order to talk to a participant who is sitting to your side.

An image capture device is placed on top of the second display area so that it captures an image of the local participant when he turns his head to face the first or second display area. Preferably, the center of the lens of the image capture device is aligned so that when both participants move their heads to a second position facing the second display area, it appears to both as if they are making eye contact.

The present invention is a video conferencing system 100 that includes: a first display area for displaying content shared between at least a first participant (a local participant 104a) at a first location and at least a second participant (a remote participant 104b) at a second location in a video conference; and a second display area 108 for displaying the video capture of the second participant (the at least first remote participant 104b), wherein the gaze of the first local participant 104b is aligned with the gaze of the first remote participant 104b so that it is spatially consistent. The video conferencing system further includes a first image capture device 112 for capturing the image of the first local participant 104a. In one embodiment, the first image capture device 112 is positioned so that it is physically located above the second display area 108 so that it captures video of the face of the local participant 104a when the local participant is facing the second display area 108.

Figure 1B:
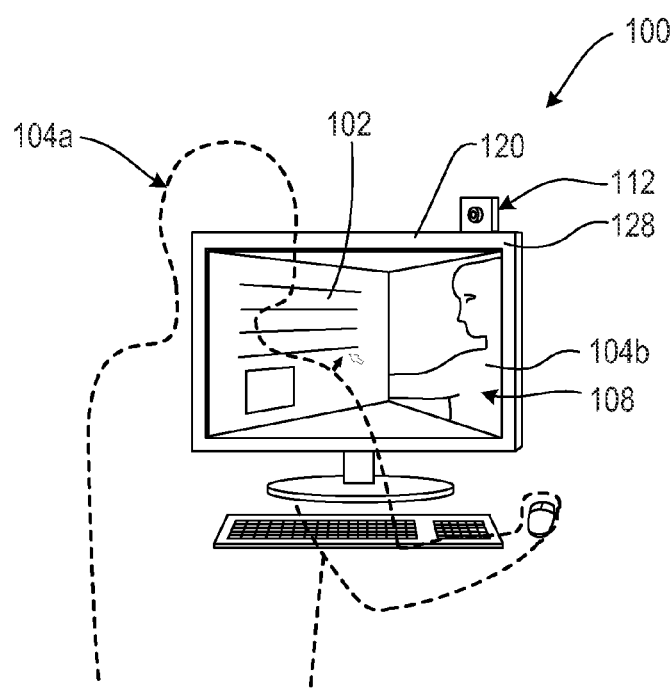
FIG. 1B illustrates a video conferencing system for simulating side by side collaboration in a video conferencing session according to an alternative embodiment of the present invention.

Referring to FIGS. 1A and 1B illustrates a schematic drawing of systems for enabling side by side collaboration in a video conferencing session according to embodiments of the present invention. In one embodiment, the video conferencing system 100 includes a first display area 102 for displaying content that is shared between at least a first local participant 104a and a first remote participant 104b (not shown) in the videoconference.

Referring to the embodiment shown in FIG. 1A, in addition to a primary display 120 for displaying a first display area 102 for displaying the shared content, the video collaboration system includes a secondary display 122 that is for displaying a second display area 108. In the embodiment shown in FIG. 1A, both the primary and secondary displays are separate physical displays. The secondary display 122 is often combined with a camera 112 or other image capture device that is located in the bevel or frame of the secondary display.

Referring to FIG. 1A, the secondary display 122 is a physically separate device that displays the second display area 108 and is preferably attached to the primary display 120 with a hinge or other attachment mechanism so that the secondary display 122 acts similarly to a wing or side mirror. The second display area 108 displays the remote participant 104*b* as if he/she is sitting to the side of or looking over the shoulder of the local participant. Because the second display area 108 displays the remote participant, the local participant 104*a* can use the full real estate of his primary display 120 to display the shared content.

Referring to FIG. 1B illustrates a video conferencing system for simulating side by side collaboration in a video conferencing session according to an alternative embodiment of the present invention. In contrast to FIG. 1A where a primary display 120 is used to display the first display area 102 and a second physically separate display 122 is used to display the second display area 108, in FIG. 1B a single display screen is used to display both the first display area 102 and the second display area 108. In the embodiment shown in FIG. 1B, the first display area 102 displays the shared content and a second display area 108 displays the remote participant. The first display area may also be referred to as the collaboration area 102. The first display area refers to an area of the screen where the local participant and remote participant(s) can share content or other artifacts.

Similar to the first embodiment, the alternative embodiment shown in FIG. 1B simulates a side-by-side collaborative experience, however utilizing a single display 120 for displaying both display areas 102, 108. The display areas 102, 108 within the single display 120 are arranged to give the impression that both the local participant 104*a* and remote participant 104*b* are both facing the shared content 102*a* shown in the first display area 102. In FIG. 1B, the outline of the local participant 104*a* is shown obliquely from the right while an image of the remote participant 104*b* is shown on the right display screen. Thus, it appears that both the local participant and the remote participant are sitting side-by-side—with the local participant 104*a* sitting on the right side of the content and the remote participant 104*b* (being displayed on second display area 108) sitting on the left side. Both the local and remote participants 104*a-b* appear to be looking at the content. Similar to the embodiment shown in FIG. 1A, the image capture device 112 is aligned and positioned over the second display area to capture the image of the local participant 104*a*, and in particular to capture eye contact of the local participant when his head is positioned to face the second display area 108-indicating his intent to interact face-to-face with the remote participant.

In the embodiment shown in FIG. 1A, both the first and second displays 120 and 122 include a display screen (first display screen 124, second display screen 126) and a frame or bezel surrounding the display screen (first display bezel 128, second display bezel 130). The second display area is displayed on a second display 122, where the second display 122 is attached to the right side of the first display 120. Alternatively, the second display 122 could be attached to the left side of the first display 120. In one embodiment, the second display is attached to the outside bezel 128 of the first display 120 with a hinge so that it can be easily moved away or towards the local participant similar to how a driver moves a side or wing mirror on a car. In an alternative embodiment, the second display is still physically located to the side of the first display, however, instead of being physically attached—the second display 122 is supported by a stand or other supporting structure some distance away from the first display 120. Although the second display can be physically separate (not attached), it should still be in close proximity to the first display—so that (1) the image capture device located above (or behind) the second display area can easily capture an image of the local participant, and (2) the image of the remote participant 104*b* displayed on the second display area is still easily viewable by local participant 104*b*.

In the embodiment shown in FIG. 1A, the image capture device 112 is a video camera integrated into the frame or bezel 130 of the display that displays the second display area 108. In the embodiment shown in FIG. 1B, the image capture device 112 is a separate component that is attached (permanently or detachably) to the frame or bezel of the display 120 above the second display area. In both embodiments, the image capture device 112 is aligned with the second display area 108 and captures the image of the local participant. In particular this alignment is such that it can simulate eye contact when the local participant's face is turned towards the image capture device—in a second position-indicating an intent to engage or face the remote participant.

In the embodiment shown in FIG. 1A, the second display area 108 is presented on a second physically separate display 122 that is attached to right side of the first display 120. In the embodiment shown, the size of the secondary display 122 and the size of the second display area 108 is smaller than the size of the first display 120 (also referred to as the primary display). However, the size of the display screens relative to each other is not critical. For example, the screen of displaying the first display area could be smaller than the second display, identical in size to the second display screen or as shown in FIG. 1A, larger than the second display screen.

In the embodiments described in FIGS. 1A and 1B, the display screen may be an LCD, plasma or LED display, for example. In another embodiment (not shown) the image capture device 112, instead of being positioned around the perimeter or frame of the display is positioned behind the screen. For the behind screen implementation (where the camera is placed behind the screen), the screen of the display screen is comprised of a see-through material. Such a system, where the camera is positioned behind a see through display screen, is described for example in the article K.-H. Tan, I. Robinson, R. Samadani, B. Lee, D. Gelb, A. Vorbau, B. Culbertson, and J. Apostolopoulos, "Connectboard: A Remote Collaboration System that Supports Gaze-aware Interaction and Sharing," in IEEE MMSP 2009, Rio de Janeiro, Brazil, October 2009. A video collaboration system having the camera positioned behind the screen may offer improved gaze compared to the systems described in FIGS. 1A and 1B since they do not have the small offset that occurs due to the positioning of the image capture device 112 above the display (higher than the plane of the eyes of the local participant viewing the second display area.)

For both the embodiment shown in FIG. 1A and the embodiment shown in FIG. 1B, the image capture device 112 is positioned over the second display area that is displaying the remote participant 104*b*. When the local participant is facing the content (a first position) shown on the display screen (display area 102), the image capture device 112 captures a view of the remote participant gazing or looking at the content. When the local participant faces the image capture device over the second display area, the image capture device captures a frontal view of the local participant. By facing the second display area (the area displaying the remote participant), the local participant is interacting directly with the remote participant—i.e. having a face-to-face interaction with the remote participant.

In the embodiments described in FIGS. 1A and 1B, the head direction of the local participant 104a changes based on whether he is viewing content or whether he is interacting with the remote participant. When the local participant is interacting with the remote participant, they turn their head to the display area displaying the remote participant. In order to simulate, eye contact (face to face interaction between the local and remote participant(s)), the image capture device 112 is physically situated so that it is aligned with the position where the remote participant's head is being displayed. In the embodiment shown in FIG. 1A, when it is desirable to interact with the local participant—the remote participant positions his head (second position) so that it is facing the second display screen and the image capture device which is approximately located in the middle of the screen. In other words, the lens of the image capture device 112 is approximately aligned with the center of the remote participant's head being displayed on the second display screen. This alignment is approximate of course because in the embodiment shown, the image capture device is not moveable while the remote participant may move or tilt their head. In one embodiment, the image capture device is capable of moving itself to align the center of the local participant's face or head to provide a improved frontal image of the local participant. In other embodiment, image modification software is used to modify the captured image to maximize the time the participant is displayed so it is centered within the second display area.

If the image capture device is aligned so that it is directly above the side display (the second display), then the remote participant would see the local participant making eye contact with them directly—not with the content. If the local participant is looking at the content—then the remote viewer would see the local participant looking away from them (no direct eye contact) when the local participant is looking at the content. Positioning the image capture device over the display of the remote participant gives this perspective which provides additional information to the local participant about how the remote participant is interacting with the content.

This perspective is consistent with working in a side-by-side collaborative environment. The eye position, for example, is consistent with the eye movement in a side-by-side collaborative environment. For example, when looking eye to eye corresponds to the face to face direct eye contact that occurs when the local participant is facing the second display area. When looking to the side, you are not looking at the person, but looking to the side at the content. The perspective of the participant viewing the content gives the other participant additional information about what the remote participant is gazing at or interacting with. This additional information is sometimes difficult to assess in other video conferencing systems—unless the remote participant is pointing to the content at issue using a mouse, etc. while discussing the content of interest.

When collaborating with remote participants during a video conferencing session, it is important to have the necessary tools to be able to communicate effectively. This can include being able to hear the remote participants, as well as being able to see them. Additionally, when these types of collaborations involve "artifacts" such as documents, presentations, physical objects, etc., it is important not only for all participants to be able to see these shared artifacts, but also for each participant to know what the other participants are viewing and interacting with. What the person is viewing is shown by the direction of the participant's eyes or gaze. Knowing what the remote person is viewing or gazing at gives further information to the local participant about how the remote participant is interacting with the content.

In both cases shown in FIGS. 1A and 1B, the goal is to simulate a side by side collaboration experience—what would happen if the remote participant was physically situated where their image appears to be. For example, the image of the remote participant in the wing mirror (the second display area 108) simulates a remote participant sitting to the side and slightly behind the local participant—looking over the local participant's shoulder. If the wing mirror were a real mirror, then if the remote participant's eyes moved towards the left of the image, then the viewer (the local participant) would interpret this eye movement as looking to the left of the shared content. If the remote participant's eyes looked directly out to the mirror, then the local participant would interpret the eye movement of the remote participant as the remote participant trying to initiate eye contact.

Preserving gaze is important in helping to determine how the remote participant is interacting with the content. Maintaining gaze awareness and spatial consistency with respect to gestures made during the remote collaboration ensures that a local participant can tell when the remote participant is looking at the local participant (face-to-face) and when the remote participant is looking at or gesturing to the shared content. Maintaining the spatial relationships for gaze and gesture awareness enables more natural communication between the participants in the video conference.

FIGS. 2A-2E shows steps in creating a view of both the remote and local participant for a second display area in a video conferencing system according to the system implementation shown in FIG. 1A. The method recited in the steps shown in FIG. 2A-2E essentially puts the local and remote participants in the video conference, on the same side of the screen—so that they are essentially in the same 3D space. In other words, the local participant and remote participants are looking at the content or artifacts from the same perspective. What the local participant sees is consistent with the remote participants such that the local participant's right is the remote participants right, the local participant's left is the remote participant's left and although the local and remote participants may be looking at different locations, the local participant's gaze angle is the remote participant's gaze angle.

The described system provides a spatially consistent perspective or view that preserves gaze and gesture awareness to simulate a spatially consistent 3D space for the local and remote participants to communicate and work within. What's different from many other video conferencing implementations, is that what the local participant sees—the remote participant looking and pointing at something—is from the same perspective as the local participant. There's a connection between the content and the remote participant (the local participant sees how they are interacting with content).

FIGS. 2A-2F shows steps in creating a view of both the remote and local participant for a second display area in a video conferencing session according to an embodiment of the present invention. For the method described in FIGS. 2A-2E, we assume the resulting display shown in FIG. 2E where both the local and remote participants are displayed in the second display area 108.

The steps shown in FIGS. 2A-2F assume the capture of video at multiple participant's sites (in the example shown at both participant 104a's location and participant 104b's location). FIG. 3A illustrates a flow diagram for a method of enabling side by side collaboration in video conferencing according to an embodiment of the present invention that includes in steps 310 and 320 the capture of video by an image capture device 112 aligned with the second display area 108. Step 340 shows the step of modifying the captured video of the first participant so that it is spatially consistent with the captured video of the second participant. Step 340 is shown in further detail in the steps shown in FIG. 2A-2F where the steps show how to modify the video to provide an environment that simulates for example, the side by side collaboration, shown in FIGS. 1A and 1B. Further, step 340 of FIG. 3A is the step of displaying the modified content (for example, as shown in the second display area 108 in FIGS. 1A and 1B for example.) Step 350 is the step of displaying the shared content (as shown, for example, in the first display area 102 shown in FIGS. 1A and 1B.)

Figure 2A:
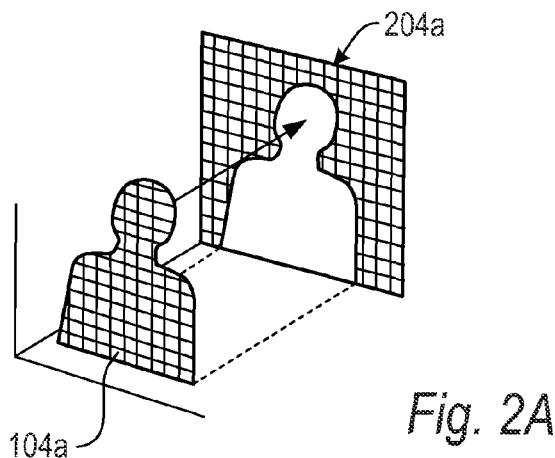
FIGS. 2A-2F shows steps in creating a side view of a remote and local participant for a second display area in a video conferencing system according to an embodiment of the present invention.
Figure 3A:
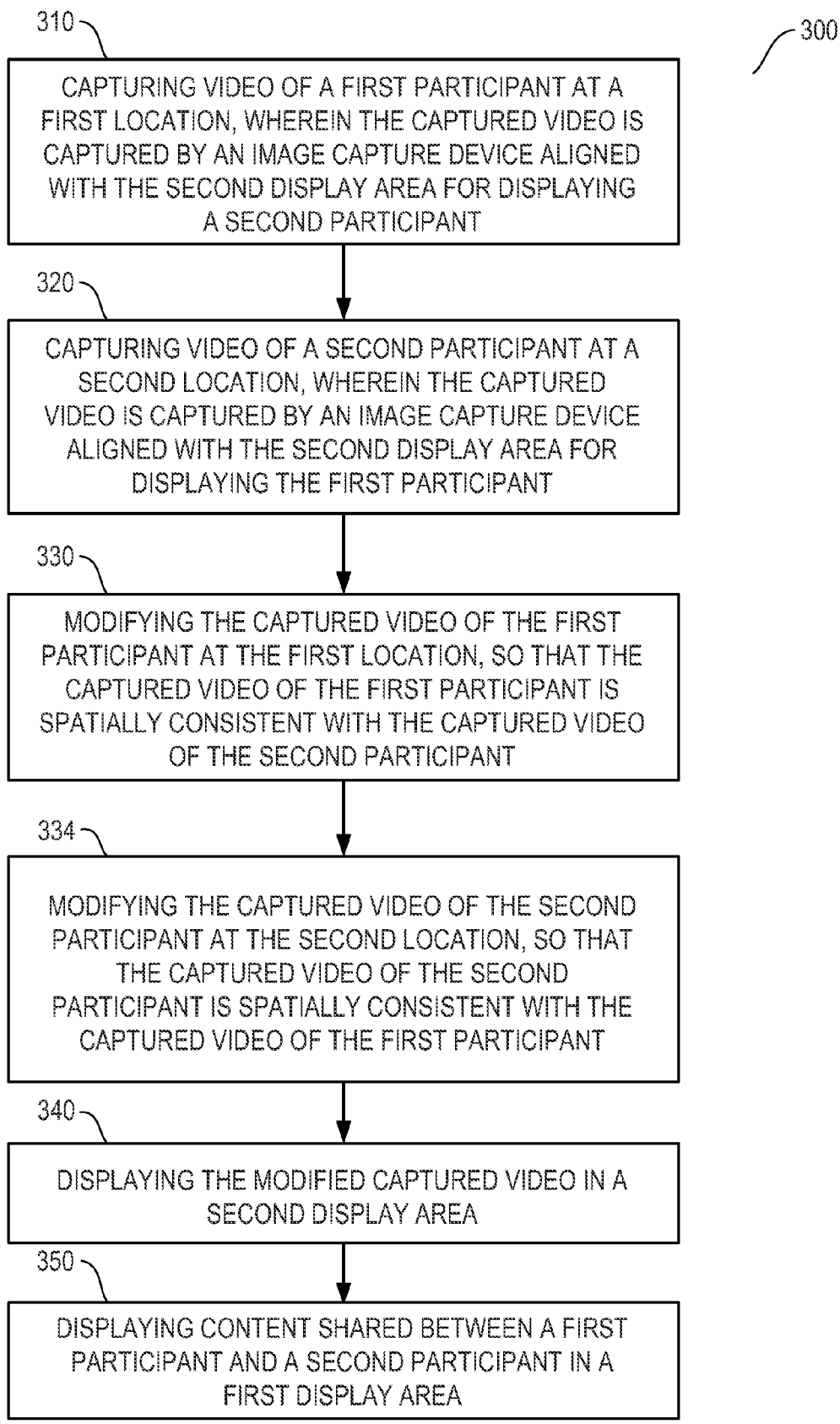
FIG. 3A illustrates a flow diagram for a method of enabling side by side collaboration in video conferencing session according to an embodiment of the present invention.

Referring to FIG. 2A shows the step of separating the local participant 104a from the background 204a of a video frame. In one embodiment, the image capture device 112 is a depth camera that is used to distinguish objects in a three dimensional space in order to distinguish the participant 104a (image in the foreground) from the background 204a. The depth sensor component of the depth camera can be for example, an active depth sensor, a stereo depth sensor, a multi-camera depth sensor, or a structured light depth sensor, among other things. For example, in one embodiment an active depth sensor actively measures the distance by transmitting a light pulse and determining the amount of time it takes for the light to return after the pulse bounces off of the object of interest, in this case typically the video conference participant. In another embodiment, a stereo depth sensor determines the distance between the object determines the distance between the object of interest and the depth sensor using stereo vision. In FIG. 2A this additional depth dimension is shown by arranging the foreground and background elements along a third depth axis (extending to the upper right)

Although a depth camera may be used to segregate the video conference participant in the foreground from the background, any image capture device or system that provides the ability to subtract or separate out an object in the foreground from a background in three dimensions may be used. For example, a set of statistics could be built to describe the distribution of color in the background, which could be used to detect and extract a foreground image of the participant. In one embodiment, face detection software (such as shown in the face detection module 748 in FIG. 7) could be used to determine the location of the participants face. The participant's face could then be separated from the image and assigned as the foreground in image frame order to implement the method shown in FIGS. 2A-2F. Further, face detection software can be used to augment the depth information in order to position and frame the participants in the second display area.

Figure 2B:
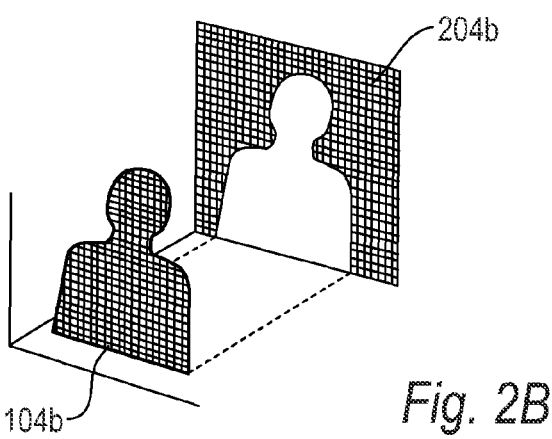

FIG. 2B shows the step of separating the remote participant 104b from the background 204b of a video frame. The process is similar to the process described for extracting the local participant from video as discussed with respect to FIG. 2A.

Figure 2C:
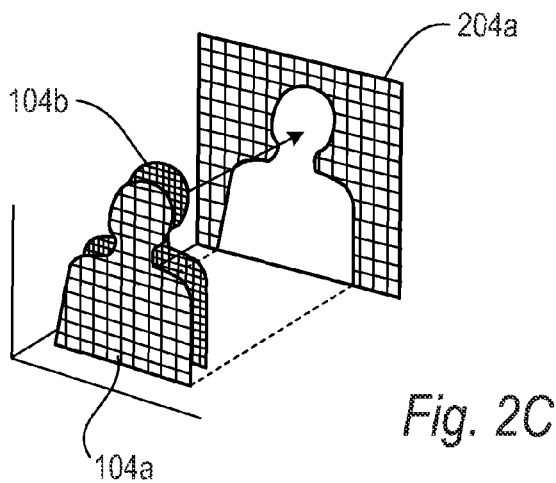

Referring to FIG. 2C shows the step of positioning the image of the remote participant so that it is slightly to the left and behind the local participant. In addition FIG. 2C shows the step of using the local participant's background. In the embodiment shown in FIG. 2C, the image of the remote participant is inserted so as to appear to be between the local participant and the local participant's background so that it appears as if the remote participant is in the local participant's environment and looking over the local participant's shoulder.

In the embodiment shown in FIG. 2C, the background of the local participant is used. Although in an alternative embodiment, backgrounds other than the local participant's background may be used (i.e., background of remote participant's cubicle, video image of beautiful sunset), use of the local participant's background can be used when it is desirable to simulates an environment which would occur if someone walked into your cube or work area to collaborate and was looking over your shoulder so that they could clearly see the content being displayed (in the first display area.)

Figure 2D:
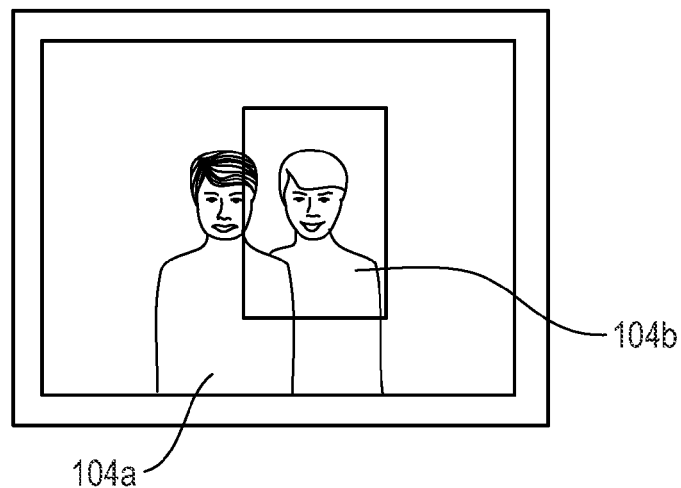

Referring to FIG. 2D shows the steps of: (1) taking the composited image shown in FIG. 2C and mirroring the image left to right; and (2) cropping the local participant's face to the edge of the video image to be displayed in FIG. 2E. Mirroring allows for the gaze direction to be communicated accurately. Different mirroring techniques for mirroring image data are available and can be applied to the video captured of the remote participant, for example by the software implemented in a mirroring module 746 shown in FIG. 7. From the perspective of the local participant, when the remote participant looks to their left, the displayed gaze of the remote participant also looks to the left. Likewise, when the remote participant looks to their right, the local participant sees the displayed gaze of the remote participant looking to the right:

Whether the video image is mirrored left to right or right to left depends on the position of the second display area relative to the first display area. For example, referring to FIG. 1A shows the second display area 108 positioned or attached so that it is to the right of the first display area 102. Thus, for the case shown in FIG. 1A is mirrored left to right.

In addition to mirroring the composited image shown in FIG. 2D, in one embodiment of the invention, the image of the local participant is cropped to the edge. The cropping in the embodiment shown in FIG. 2D, provides the local participant with a view of the side of his face. It provides a visual cue (a partial side view) to the local participant 104a about the gaze, position, etc. of the remote participant's face 104b relative to his/her own face.

Figure 2E:
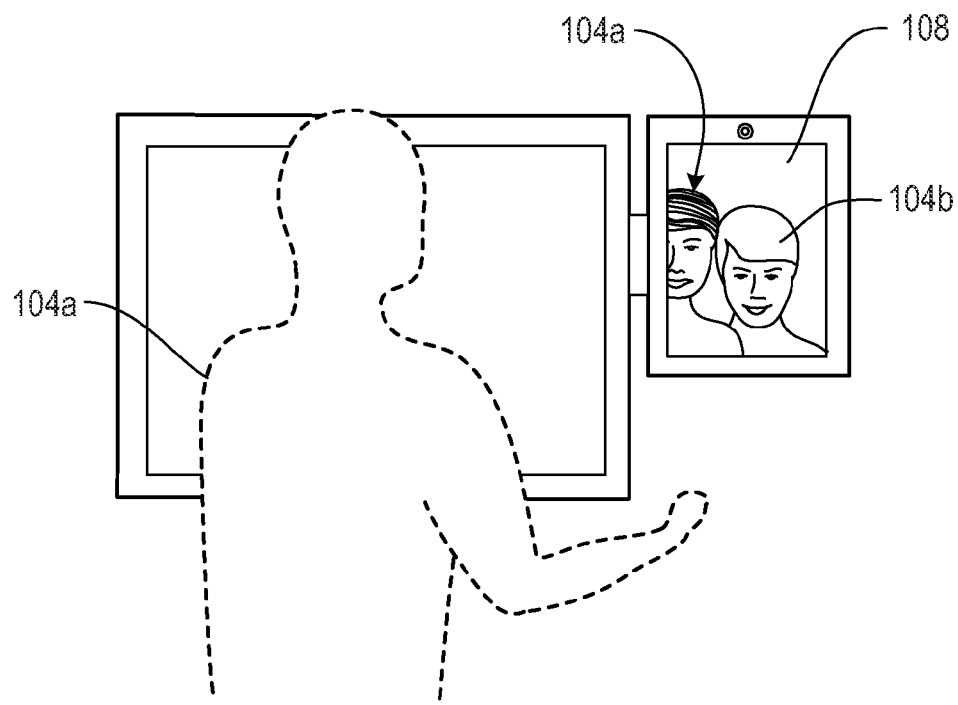

Referring to FIG. 2E shows the last step in the process of creating a modified video to be displayed. The composited cropped image of FIG. 2D is displayed in the second display area in a second display that is located on the side of a first display area.

Although in the embodiment shown in FIG. 2E a side cropped view of the local participant is displayed, in an alternative embodiment of the invention, only an image of the remote participant—(not the image of the local participant) is displayed in the second display area. In this case, although the only the remote participant would be displayed, it is still necessary that the 3D space and gaze of the remote participant be spatially consistent with the local participant. Where only a remote participant is used, the process shown in the steps shown in FIG. 2A-2E would be modified. For example, since it may still be preferred to use the background of the local participant—the step of separating the foreground from the background shown in FIG. 2A could still occur. However, because only one participant is being displayed, the step shown in FIG. 2C would be deleted. Further, although the mirroring step shown in FIG. 2D would still be required, because a local participant is not displayed, the step of cropping to the edge the local participant's face would be deleted from the process shown in the method shown in FIG. 2A-2E.

Figure 2F:
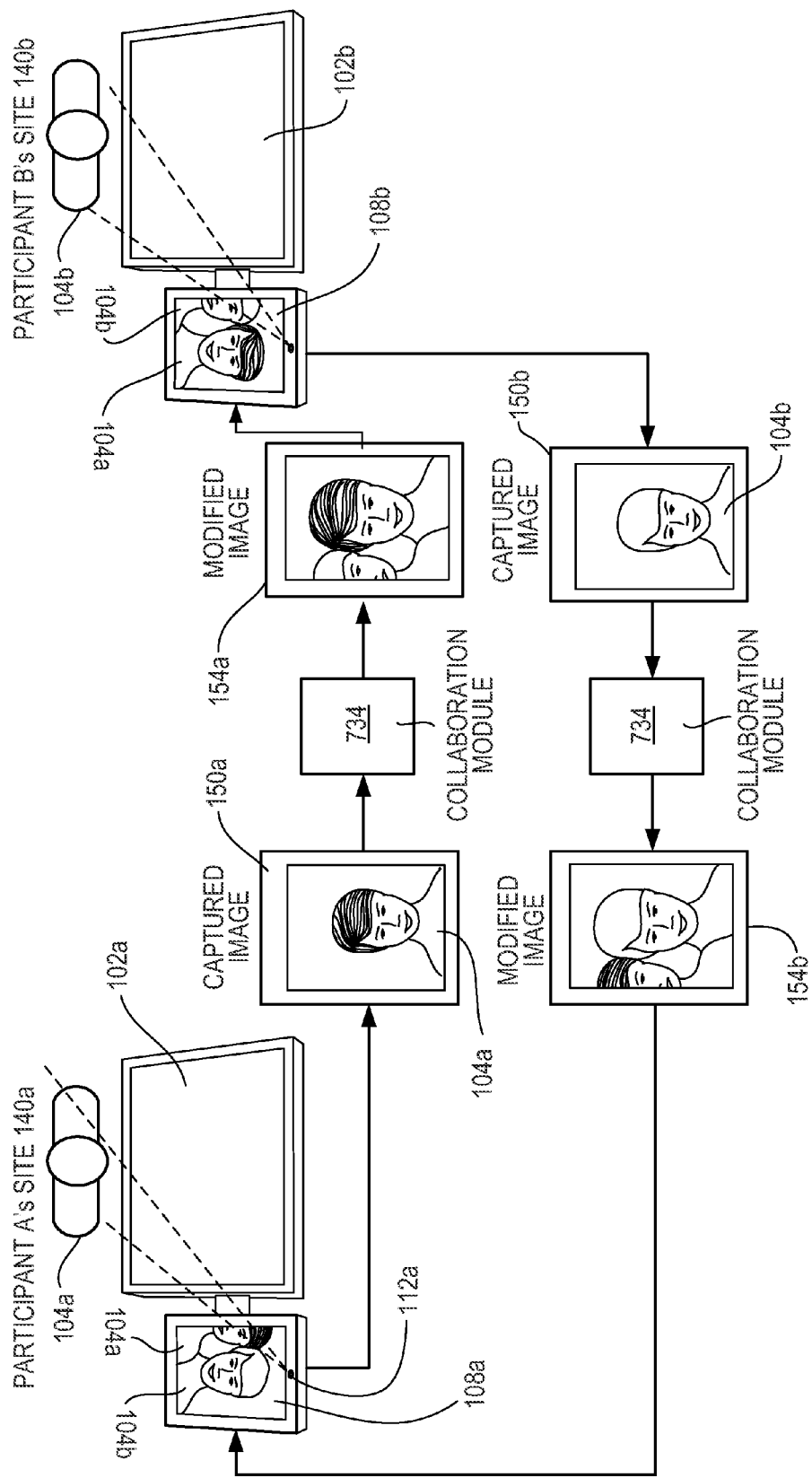

In the above example, it is presumed that the remote participant 104b is gazing at a complimentary remote second display area 108 at a different remote location (Participant B's site). Similarly, the local participant 104a is also gazing at the second display area 108 at it's site. Referring to FIG. 2F shows a partial view of the process for implementation in FIG. 1A, where the process for implementation is shown concurrently at both the local participant's site 140a and the remote participant's site 140b.

The captured image 150*a* (captured by image capture device 112*a*) at the local participant's site 140*a* is combined (not shown) with the captured image 150*b* (captured by the image capture device 112*b*) at the remote participant's site—according to the steps described with FIGS. 2A-2E by the video collaboration module 734 to create the modified image 154*a*. Similarly, the captured image 150*b* (captured by depth camera 112*b*) at the remote participant's site 140*b* is combined (not shown) with the captured image 150*a* (captured by the depth camera 112*a*) at the local participant's site—according to the steps described with FIGS. 2A-2E by the video collaboration module 734 to create the modified image 154*b*. Thus, for example, the image of the remote participant 104*b* gazing into the second display area 108*b* at the remote participant's video conferencing location 140*b* is processed so that the image of the remote participant 104*b* appears to be sitting beside the local participant 104*a* in the second display area 108*b* at the remote participant's location. Thus, when the remote participant 104*b* looks at the second display area 108*b*, the image of the local participant 104*a* appears to be gazing out of the second display area 104*b* at the remote participant.

FIG. 1B is a variation on the video conferencing system shown in FIG. 1A. Because only a single remote participant is shown, the steps in FIGS. 2A-2E are modified to display the representation shown in FIG. 1B of the remote participant. For example, in FIG. 2D, only the remote participant's view is mirrored. In FIG. 1B, the second display is positioned so that the windows or display areas for the for the shared content and the remote participant are arranged to give the impression that the local participant and the remote participant are both facing the shared content, but one obliquely from the left (the local participant) and the other from the right (the remote participant).

FIG. 3A illustrates a flow diagram for a method of enabling side by side collaboration in video conferencing according to an embodiment of the present invention. Referring to FIG. 3A shows the steps of: capturing video of a first participant at a first location wherein the captured video is captured by an image capture device aligned with a second display area for displaying a second participant (step 310); capturing video of a second participant at a second location wherein the captured video is captured by an image capture device aligned with a second display area for displaying a second participant (step 320); modifying the captured video of the first participant so that the captured video is spatially consistent with the captured video of the second participant (step 330); and modifying the captured video of the second participant so that the captured video is spatially consistent with the captured video of the first participant (step 334).

After the captured images are modified as described in steps 330 and 334, they are displayed. The modified video is displayed in the second display area 108 for both the local participant and for the remote participant 104*b*. Thus, the modified captured video of the first participant is displayed in a second display area (step 340). Similarly, the modified captured video of the second participant is displayed in the second display area (step 340). Similarly, the content or artifact shared between a first participant and a second participant is displayed in a first display area (350). Thus referring to FIG. 2F for example, for participant 104*a*, the content is displayed in a first display area 102*a* and for participant 104*b*, the content is displayed in a first display area 102*b*.

Figure 3B:
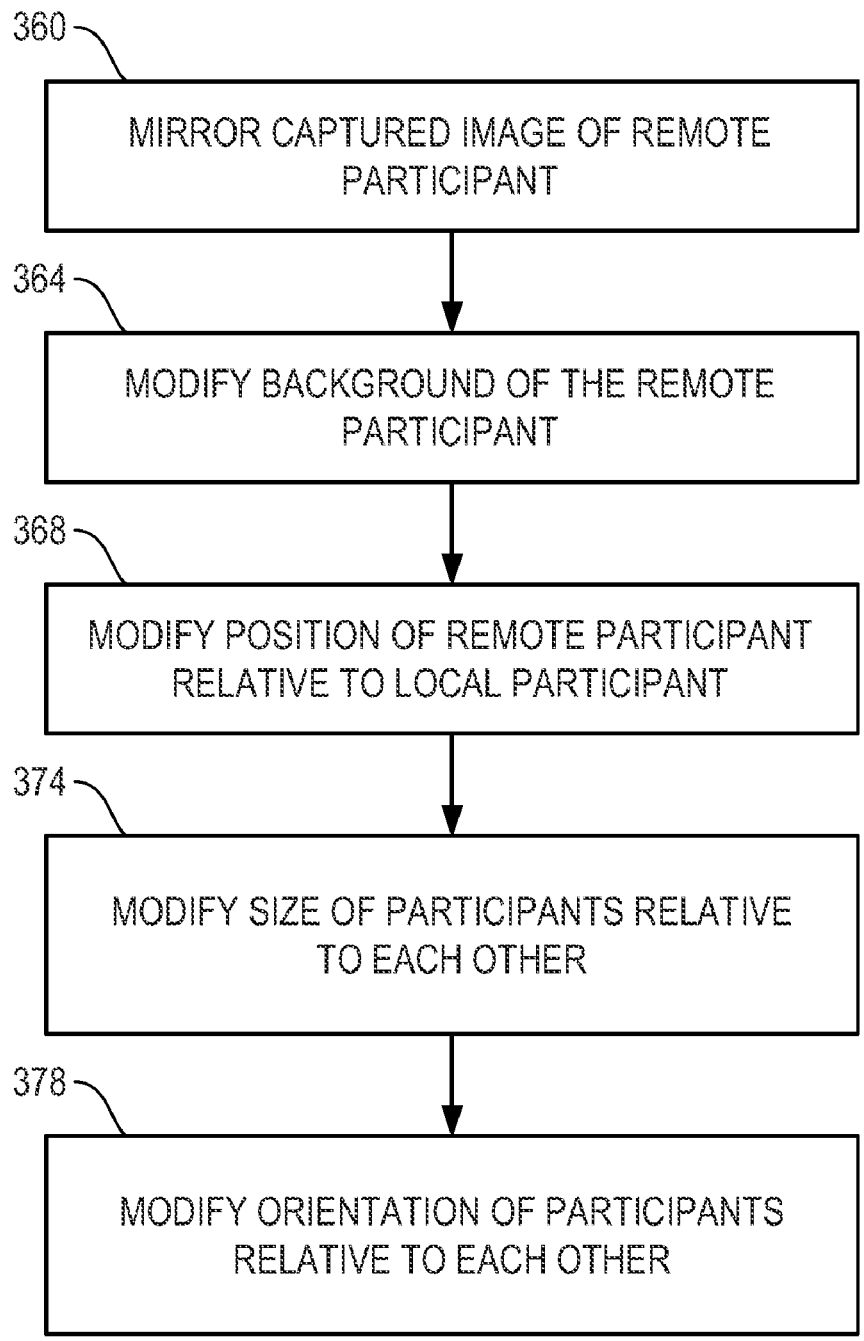
FIG. 3B illustrates a flow diagram for a method of modifying captured video image so that the captured video of the remote participant is spatially consistent with the local participant.

FIG. 3B illustrates a flow diagram for a method of modifying captured video image so that the captured video of the remote participant is spatially consistent with the local participant according to an embodiment of the invention. Spatial consistency refers to the process of modifying the captured video so that the local and remote participants are operating from the same perspective (essentially the same 3D space) with respect to the content. In the present invention, providing spatial consistency includes at least: mirroring the video of the remote participant (step 360). In the present invention, the mirroring (left to right or left to right) is based on the position of the second display area relative to the first display area.

In addition, to mirroring the video of the remote participant—providing spatial consistency includes providing a gaze consistent with the local participant's. For example, although the gaze of the remote participant may be in a different direction from the local participant—the gaze is from approximately the same (xyz) position within a 3D space with respect to the content on the first display.

FIG. 3B illustrates a flow diagram for a method of modifying captured video image so that the captured video of the remote participant is spatially consistent with the local participant. Referring, to FIG. 3B, some of the steps listed are optional in creating a collaborative environment between the local and remote participants that is spatially consistent. However, dependent on the implementation (for example, FIG. 1A or 1B), performing the steps shown in FIG. 3B may provide an environment that is more intuitive to the local participant. Providing a spatially consistent environment, may depend on the location of the second display area relative to the first display area. For example, if the second display area is to the left or the right of the first display area—may change how the captured video is mirrored.

Referring to FIG. 3B, some of the steps that may be used to provide a spatially consistent environment include the steps of: mirroring the captured image of remote participant (step 360); modifying the background of the remote participant (step 364) to the background of the local participant; modifying the location or position of the local participant relative to the remote participant (step 368); modifying the size of the remote participant's image relative to the local participant's image (step 374); and modifying the orientation of the remote participant's image relative to the local participant (step 378).

Referring to the method shown in FIGS. 2A-2E, the step of mirroring the captured image of remote participant (step 360) is shown and discussed with reference to FIG. 2D. Referring to FIGS. 2A-2E, the step of modifying the background of the remote participant (step 364) to the background of the local participant is shown and discussed with reference to FIG. 2C. Referring to the method shown in FIGS. 2A-2E, modifying the location or position of the local participant relative to the remote participant (step 368) is shown and discussed with reference to FIG. 2C.

Referring to FIG. 3B shows the step of modifying the location or position of the local participant relative to the remote participant. Modifying the position of the participants relative to each other, also modifies the gaze of the participants relative to each other. In the described embodiment, the positions are modified so that the gaze of the captured image of the remote participant is spatially consistent with the gaze of the local participant. The view of the remote participant is captured and presented on the local participant's second display area in such a way that their apparent gaze directions with respect to the shared content and the local participant conform to the local participant's sense of their own position and the location of the shared content on the local participant's first display area. Although steps 360, 364, 368 refer to the remote participant, this is for purposes of example only and the steps could be alternatively performed with respect to a local participant.

Figure 7:
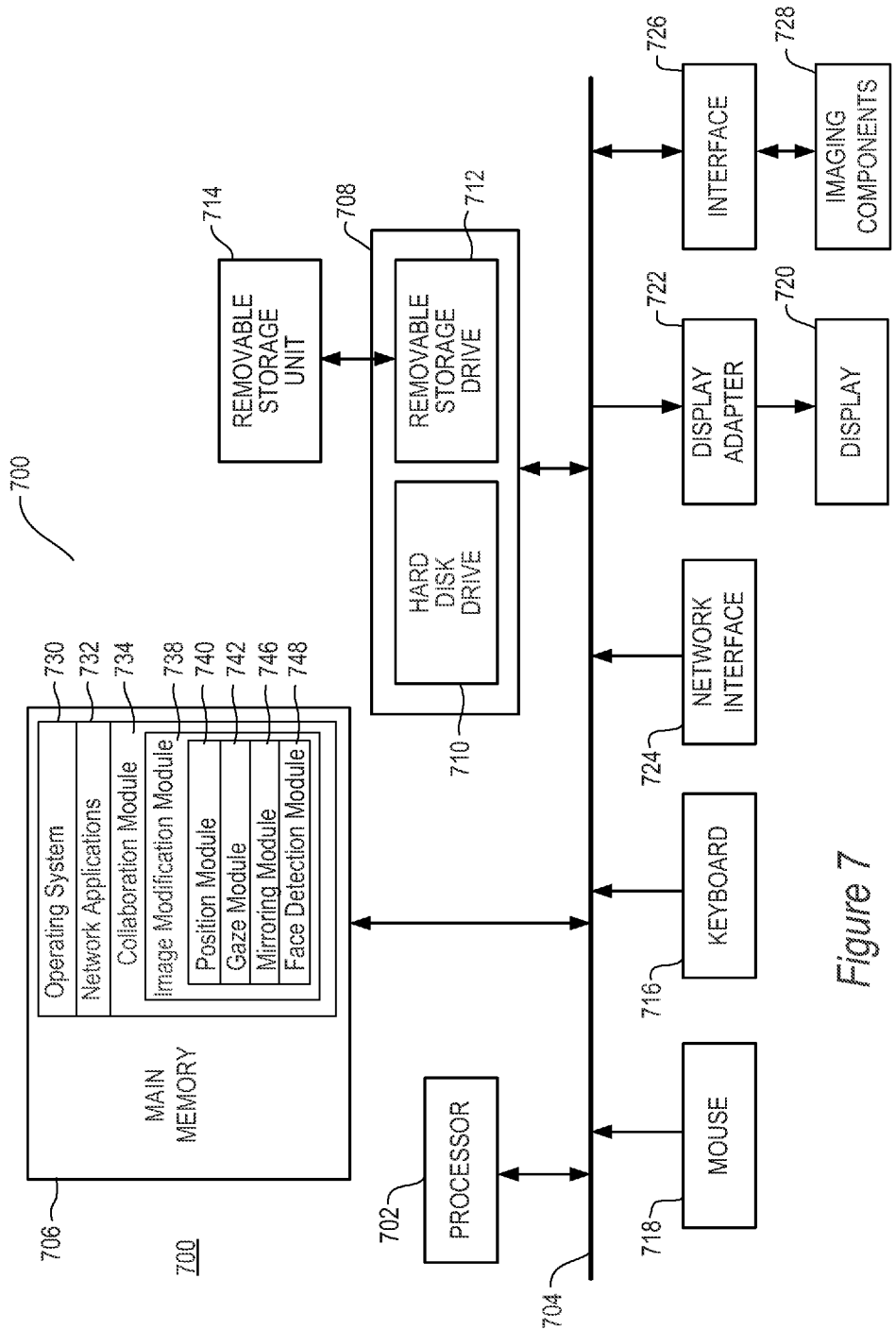
FIG. 7 is computer system for implementing the methods in accordance with an embodiment of the present invention.

By Spatially consistent, we mean that a that one inch movement in the xyz direction in the local participant's 3D space (xyz space of a local participant) corresponds to the same one inch of movement in xyz space of remote participant. Because a spatially consistent environment also provides spatial consistency with respect to an angular movement, in a video of the local participant if the eyes of the remote participant moves downwards at a 30 degree angle towards the content—this angular movement corresponds to a 30 degree angular movement towards the content in the local participant's environment. The local participant may not be moving their eyes at the same 30 degree angle (for example, it is likely that they may be sitting in a position that they are viewing the content from another angle), however, because of the correspondence to their environment—the local participant has a good intuitive sense of the motion in their space or environment. Ideally, the correspondence between the one inch motion in the local participant's environment and the remote participant's environment has a 1:1 correspondence (one inch in local participant's environment equals one inch in remote participant's environment). The correspondence can be modified (say for example a 1.1:1 correspondence), however, the modification could deteriorate the intuitive feel to the environment and create errors in the remote or local participant's perception of where the other participant is gazing, Referring to FIG. 7, shows a gaze module 742 that is part of the video collaboration module 734 in the system 700. The gaze module 742 detects and modifies the participant's gaze in the video conferencing session described so that the participant's gaze are spatially consistent. Because the environment of the remote and local participants may be different (for example, the distance and angle of the remote and remote participant from the screen, the alignment of the local or remote participant's head with the camera, etc.) at different participant sites, modifications to the captured video may be necessary to provide an accurate gaze. Further, the position of different image capture devices within the system may result in different gaze detection software being used. For example, the patent application having application number PCT/US2010/042305, filed on Jul. 18, 2010, having the title "Methods and Systems for Establishing Eye Contact and Accurate Gaze in Remote Collaboration," which is hereby incorporated by reference, describes an implementation used to provide accurate gaze for an implementation where a see-through screen is used. Other methods for gaze correction may be preferable dependent upon the system implementation and factors which need correction.

In many video collaborative systems, it's difficult to tell whether the remote participant is looking at the content. Many times how the remote participant is interacting with the content can only be known by the position of the mouse or other pointing device as the remote participant is pointing to the object of interest. For example, a system might show eye contact but you might not know if the participant is looking at the shared content—until you see them point and click on the item that they are looking at. Whereas in the current application—you know by the remote participant's gaze that she's referring to an object on the left top half of screen—because that's where her gaze is. In this case, where the mouse is pointing provides confirmation information.

Pointing functions can be performed, for example, using the mouse cursors of the local and remote participants. However, the added gaze information provided by the described system helps to convey the focus of the remote collaborator's attention since in some cases, the pointer function may not be indicative of where the participant's focus is. For example, say the participant is just randomly moving their mouse around. Alternatively, say the participant is just lazily leaving their hand on the screen, for example without realizing that they still gesturing to the screen. If all you see is the remote participant's finger on the screen—and the system does not provide accurate gaze direction, then you most likely make the assumption that they are looking at and referring to what they are pointing at. The present system provides accurate gaze information which in combination with the gesture or pointing information allows the participant to independently confirm the pointing function or gesture with gaze. This makes it easier for the participants in the video conference to pick up on subtleties of interpersonal communication—similar to if the remote participant and local participant were sitting side-by-side.

Referring to FIG. 3B, one step that may be used to provide captured video of the remote participant that is spatially consistent with the local participant is the modifying the size of the remote participant's image relative to the local participant's image (step 374). Dependent, for example, if the distance of the remote participant from the screen is double the distance of the local participant from the screen, without modification—the size of the remote participant's image may appear to be smaller than the size of the local participant's image. By modifying the image of the remote participant's image relative to the local participant, so that the sizes of their images appear more comparable, helps to support the simulation of two participants sitting side-by-side and collaborating.

In one embodiment, instead of there being a single remote participant displayed, multiple remote participants are displayed. For example, in one embodiment, a second remote participant could be displayed in a second wing mirror configuration—where a third display area (not shown), similar to the mirror shown in FIG. 1A, would be positioned on the left hand side of the first display area. Similar to the embodiment shown in FIG. 1A, an image capture device would be positioned above the third display area so that when the local participant wished to interact with the second remote participant displayed to the left, the local participant would turn his head towards the camera on the left to have a face-to-face interaction with the second remote participant. Further, an alternative embodiment, more than one remote participant is displayed in the second display area. In this alternative embodiment, the video from both a first and second remote participant is added to the local participant's background as shown in FIGS. 2B and 2C.

In one embodiment, instead of placing the second display area on a separate display that is physically located to the side, the second display area is mounted above the first display area. Instead of a side wing mirror, the separate display is configured and acts as a "rear-view mirror" mounted on top of the participant's monitor. This implementation might be particularly appropriate in dual monitor set-ups, with the device mounted centrally above the two screens. For example, with a top mounted display above two screens. Implementation using two screens which provides the system increased display space, provides an increased ability you more ability to show which way the person is looking. A landscape style screen may be more appropriate in this situation. The additional width could accommodate additional remote participants and/or the "reflection" of a local collaborator physically looking over the local participant's shoulder.

In one embodiment, the mirror-like qualities of the second display areas 108 could be enhanced by using depth information to create motion parallax effects as the participant moves their head. This is done by moving the background portion of the local participants image in a direction opposite to the local participant's detected head motion.

FIGS. 4A-4D illustrates a top view of the arrangement in virtual space of a local and remote participant in a video conferencing system according to an embodiment of the present invention shown in FIG. 1B Referring to FIGS. 4A-4D, shows where the content and the two participants forming a triangle. In actuality, both end-points have their cameras mounted on the same sides of the display screen, and both show the other participant on the same side. (To not do this would mean that a camera would be required on each side, or a movable camera would have to be set up, so that the participants could be on opposite sides.) The image of the remote participant is therefore mirrored left to right so that they appear to face the shared screen. Gaze angles with respect to the screen are not so accurately conveyed because of the simulated spatial arrangement. However, video conference participants can determine when the other participant in the video conference is looking at the content displayed in and when they are looking at them.

Figure 4A:
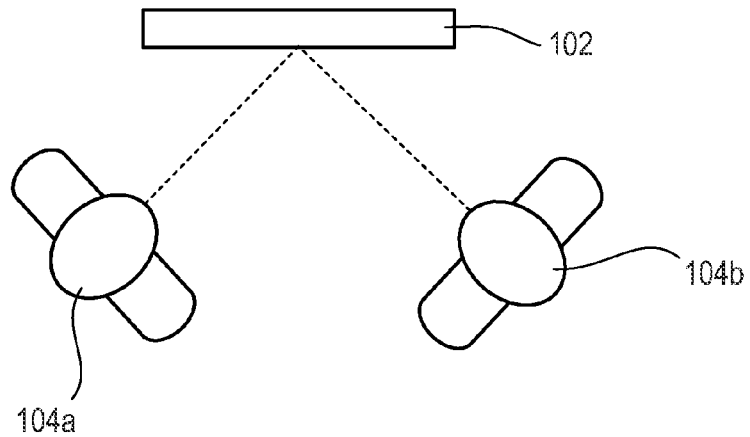
FIGS. 4A-4D illustrates the arrangement in virtual space of the local and remote participant in a video conferencing system according to an embodiment of the present invention.
Figure 4B:
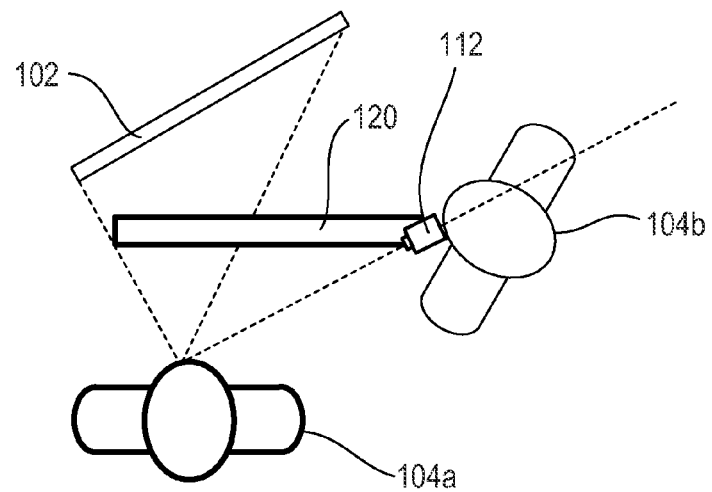
Figure 4C:
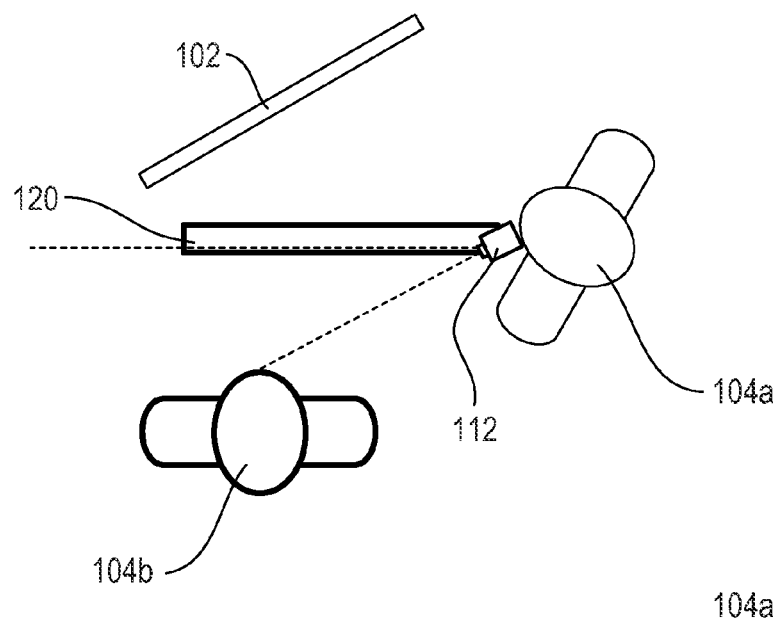
Figure 4D:
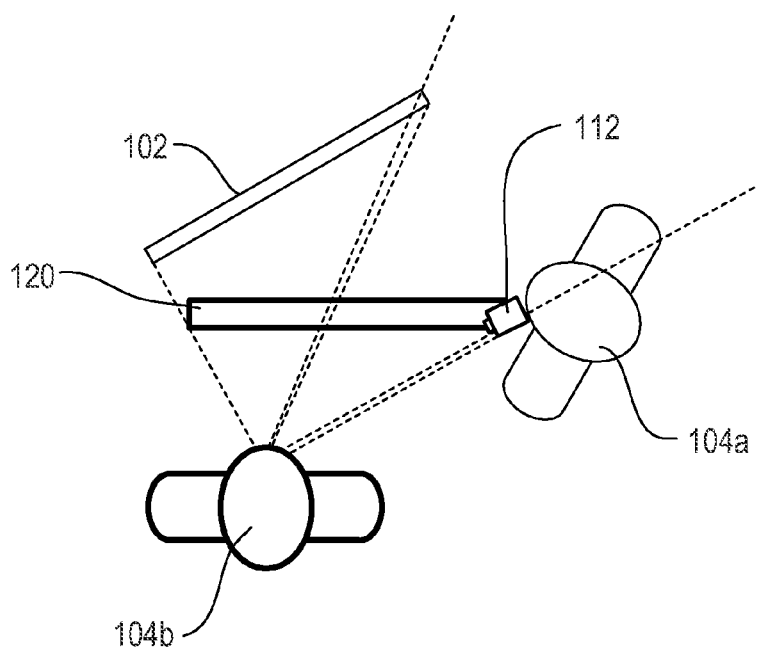

Referring to FIG. 4A, shows the physical video collaboration arrangement that is being simulated in virtual space. FIG. 4B shows the actual arrangement occurring during the video conference. FIG. 4C shows the field of view being captured by participant A's camera. FIG. 4D shows the configuration that roughly matches participant B's view of participant A (after mirroring) and participant A's view of participant B (after mirroring.)

Figure 5A:
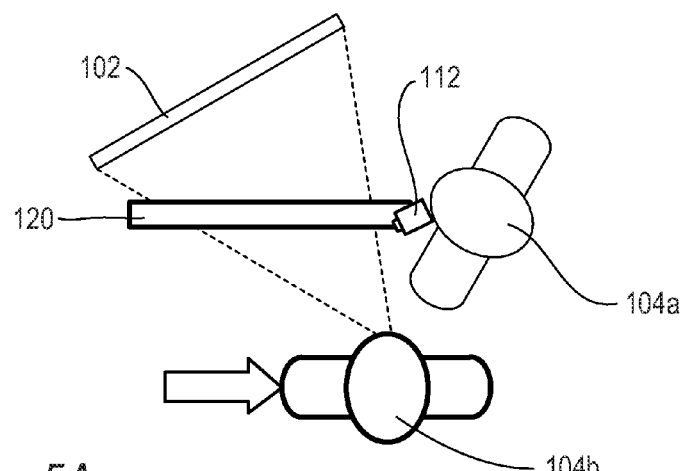
FIGS. 5A-5C illustrates the arrangement in virtual space based on different body positions of the local participant in a video conferencing system according to an embodiment of the present invention.
Figure 5B:
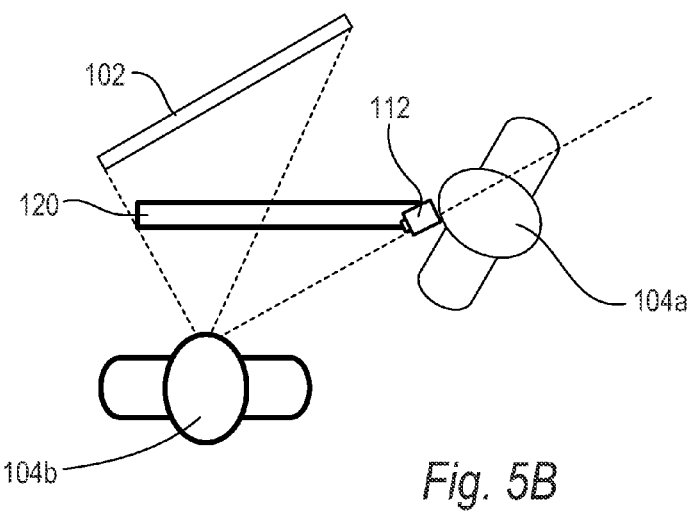
Figure 5C:
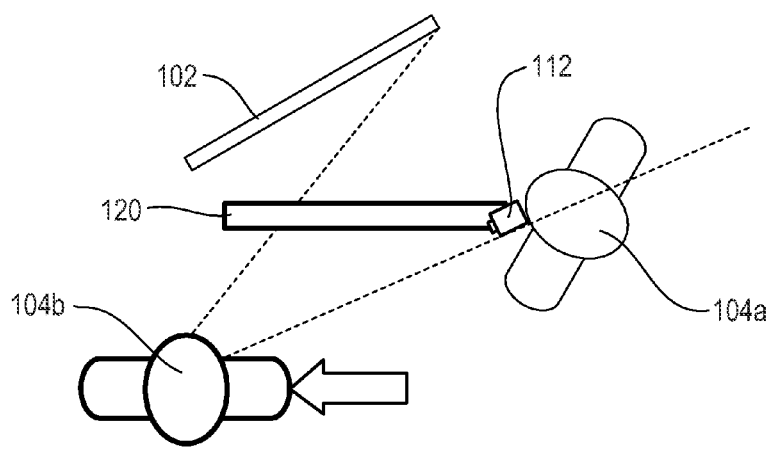

In the configuration described in FIG. 1B, we can use detected head position to change the apparent angles of the shared content and collaborator windows for that participant. Moving towards the right brings a more head-on view of the content screen (useful for detailed content creation), while moving to the left provides more real estate to the remote participant to enhance collaboration. FIGS. 5A-5C illustrates the arrangement in virtual space based on different body positions of the local participant in a video conferencing system according to an embodiment of the present invention. Referring to FIG. 5A shows a local participant moving to the right of the display screen to bring more of the content into view in the first display area. FIG. 5B shows the default position (participant center in front of the screen—slightly to the left.) FIG. 5C shows the local participant moving to the left of the default position in order to bring the remote participant more into view.

Figure 6:
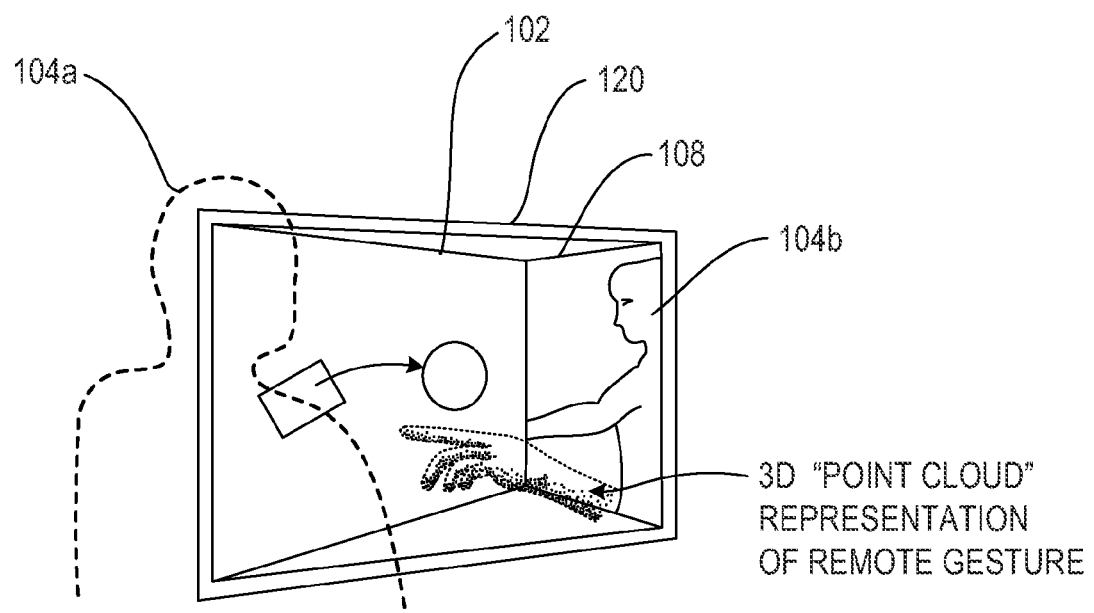
FIG. 6 illustrates a 3D point cloud representation of a gesture by a remote participant in a video conferencing system according to an embodiment of the present invention.

Gesture positioning is capturing where the local participant's hand is in front of the content (on the main screen) and displaying that information to the remote participant. In the implementations shown in FIGS. 1A and 1B, depth cameras can also be used to capture gestures close to the screen as described in the patent application having application PCT/US2009/040870, filed Apr. 16, 2009, "System for Conveying Near-Screen Gestures to Remote Collaborators." In the referenced application, a method was described in which 3D information from a depth camera or cameras covering the volume in front of the screen is used to create representations of a remote participant's gestures near the screen, but recreated from the viewpoint of the local participant. FIG. 6 illustrates a 3D point cloud representation of a gesture by a remote participant in a video conferencing system according to an embodiment of the present invention. In the implementation shown in FIG. 6, the angled views of the two windows create an implicit volume in front of the collaboration screen in which these 3D reconstructions of gestures can be rendered. Further description of a system and method for using a depth camera to capture gestures is described in the pending application filed Apr. 16, 2009, having application number PCT/US2009/0408790, "Communicating Visual Representations in Virtual Collaboration Systems," which is hereby incorporated by reference.

It should be apparent to those of ordinary skill in the art that the method 300 represents generalized illustrations and that other steps may be added or existing steps may be removed, modified or rearranged without departing from the scopes of the method 300. The descriptions of the method 300 are made with reference to the system 100 illustrated in FIG. 1 and the system 700 illustrated in FIG. 7 and thus refers to the elements cited therein. It should, however, be understood that the method 300 is not limited to the elements set forth in the system 700. Instead, it should be understood that the method 300 may be practiced by a system having a different configuration than that set forth in the system 700.

Some or all of the operations set forth in the method 300 may be contained as utilities, programs or subprograms, in any desired computer accessible medium. In addition, the method 300 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

FIG. 7 illustrates a block diagram of a computing apparatus 700 configured to implement or execute the methods 300 depicted in FIGS. 3A and 3B, according to an example. In this respect, the computing apparatus 700 may be used as a platform for executing one or more of the functions described hereinabove with respect to the collaboration module 734.

The computing apparatus 700 includes one or more processor(s) 702 that may implement or execute some or all of the steps described in the methods 300. Commands and data from the processor 702 are communicated over a communication bus 704. The computing apparatus 700 also includes a main memory 706, such as a random access memory (RAM), where the program code for the processor 702, may be executed during runtime, and a secondary memory 708. The secondary memory 708 includes, for example, one or more hard drives 710 and/or a removable storage drive 712, representing a removable flash memory card, etc., where a copy of the program code for the method 700 may be stored. The removable storage drive 712 reads from and/or writes to a removable storage unit 714 in a well-known manner.

Exemplary computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

Although shown stored on main memory 706, any of the memory components described 706, 708, 714 may also store an operating system 730, such as Mac OS, MS Windows, Unix, or Linux; network applications 732; and a collaboration and control module 734. The operating system 730 may be multi-participant, multiprocessing, multitasking, multithreading, real-time and the like. The operating system 730 may also perform basic tasks such as recognizing input from input devices, such as a keyboard or a keypad; sending output to the display 720; controlling peripheral devices, such as disk drives, printers, image capture device; and managing traffic on the one or more buses 704. The network applications 732 includes various components for establishing and maintaining network connections, such as software for implementing communication protocols including TCP/IP, HTTP, Ethernet, USB, and FireWire.

The computing apparatus 700 may also include an input devices 716, such as a keyboard, a keypad, functional keys, etc., a pointing device, such as a tracking ball, cursors, etc., and a display(s) 720, such as the screen displays 120, 122 shown for example in FIG. 1A. A display adaptor 722 may interface with the communication bus 704 and the display 720 and may receive display data from the processor 702 and convert the display data into display commands for the display 720.

The processor(s) 702 may communicate over a network, for instance, a cellular network, the Internet, LAN, etc., through one or more network interfaces 724 such as a Local Area Network LAN, a wireless 802.11x LAN, a 3G mobile WAN or a WiMax WAN. In addition, an interface 726 may be used to receive an image or sequence of images from imaging components 728, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A video conferencing system comprising:
   a first display area for displaying content shared between at least a first participant at a first location and a second participant at a second location in a video conference; and
   a second display area for displaying at least the video captured of at least the first participant and the second participant, wherein the video captured of the at least first participant is spatially consistent with the video captured of the at least second participant, wherein the gaze of the first participant is aligned with the gaze of the second participant so that it is spatially consistent.

2. The video conferencing system recited in claim 1 further including a first image capture device at a first location for capturing the image of the first participant, wherein the first image capture device is aligned with second display area at the first location.

3. The video conferencing system recited in claim 1 further including a second image capture device at a second location for capturing an image of the second participant, wherein the second image capture device is aligned with the second display area at the second location.

4. The video conferencing system recited in claim 2 wherein the first image capture device is positioned above a display screen displaying the second display area.

5. The video conferencing system recited in 2 wherein the first image capture device is positioned behind the display screen displaying the second display area.

6. A computer readable storage medium comprising computer readable program instructions stored thereon for causing a computer system to perform a method for enabling collaboration in a video conferencing session, the computer readable program instructions comprising:
   computer readable program instructions to, when executed by a processor, modify the captured video of at least a first participant at a first location so that the captured video of at least first participant is spatially consistent with the captured video of at least a second participant at a second location; and
   computer readable program instructions to, when executed by a processor, display the modified captured video in a second display area.

7. The computer readable storage medium recited in claim 6, further comprising computer readable program instructions to, when executed by a processor, display content shared between at least the first participant and at least the second participant in a first display area.

8. The computer readable storage medium recited in claim 6, further comprising computer readable program instructions to, when executed by a processor, modify the captured video of at least a second participant at a second location so that the captured video of at least second participant is spatially consistent with the captured video of at least a first participant at the first location.

9. The computer readable storage medium recited in claim 6, wherein the computer readable program instructions to, when executed by a processor, modify the captured video of the at least first participant so that the captured videos of at least the first participant is spatially consistent with the captured video of the second participant further comprises computer readable program instructions to, when executed by a processor, mirror the captured video of the first participant.

10. The computer readable storage medium recited in claim 6, wherein the computer readable program instructions to, when executed by a processor, modify the captured video of the at least first participant so that the captured videos of at least the first participant is spatially consistent with the captured video of the second participant further comprises computer readable program instructions to, when executed by a processor, modify the background of the first participant.

11. The computer readable storage medium recited in claim 6, wherein the computer readable program instructions to, when executed by a processor, modify the captured video of the at least first participant so that the captured videos of at least the first participant is spatially consistent with the captured video of the second participant further comprises computer readable program instructions to, when executed by a processor, modify the position of the first participant relative to the position of the second participant.

12. The computer readable storage medium recited in claim 6, wherein the computer readable program instructions to, when executed by a processor, modify the captured video of the at least first participant so that the captured videos of at least the first participant is spatially consistent with the captured video of the second participant further comprises computer readable program instructions to, when executed by a processor, modify the gaze of the first participant relative to the gaze of the second participant.

13. The computer readable storage medium recited in claim 6, wherein the computer readable program instructions to, when executed by a processor, modify the captured video of the at least first participant so that the captured videos of at least the first participant is spatially consistent with the captured video of the second participant further comprises computer readable program instructions to, when executed by a processor, modify the size of the first participant relative to the second participant.

14. The computer readable storage medium recited in claim 6, wherein the computer readable program instructions to, when executed by a processor, modify the captured video of the at least first participant so that the captured videos of at least the first participant is spatially consistent with the captured video of the second participant further comprises computer readable program instructions to, when executed by a processor, modify the orientation of the first participant relative to the second participant.

15. A method executed on a processor for enabling collaboration in a video conferencing session, the method comprising:

modifying the captured video of at least a first participant at a first location so that the captured video of at least first participant is spatially consistent with the captured video of at least a second participant at a second location; and displaying the modified captured video in a second display area.

16. The method recited in claim 15, further comprising displaying content shared between at least the first participant and at least the second participant in a first display area.

17. The method recited in claim 15, further comprising capturing video of at least a second participant at a second location so that the captured video of at least second participant is spatially consistent with the captured video of at least a first participant at a first location.

18. The method recited in claim 17, further comprising modifying the captured video of at least a second participant at a second location so that the captured video of at least second participant is spatially consistent with the captured video of at least a first participant at the first location.

19. The method recited in claim 15 wherein the captured video of the of the first participant at the first location is captured by a first image capture device at the first location, wherein the first image capture device is aligned with a second display area at the first location.

20. The method recited in claim 17 wherein the captured video of the of the second participant at the second location is captured by a second image capture device at the second location, wherein the second image capture device is aligned with a second display area at the second location.

* * * * *

UNITED STATES PATENT AND TRADEMARK OFFICE
CERTIFICATE OF CORRECTION

PATENT NO. : 8,395,655 B2
APPLICATION NO. : 12/856668
DATED : March 12, 2013
INVENTOR(S) : Ian N Robinson et al.

Page 1 of 1

It is certified that error appears in the above-identified patent and that said Letters Patent is hereby corrected as shown below:

In the Claims:

In column 15, line 65, in Claim 5, delete "2" and insert -- claim 2 --, therefor.

In column 18, line 14, in Claim 19, delete "of the of the" and insert -- of the --, therefor.

In column 18, line 19, in Claim 20, delete "of the of the" and insert -- of the --, therefor.

Signed and Sealed this
Thirteenth Day of August, 2013

Teresa Stanek Rea
*Acting Director of the United States Patent and Trademark Office*